Feb. 16, 1937.  G. H. TOMLINSON  2,070,632
METHOD OF TREATING PULP MILL WASTE COOKING LIQUORS
Filed March 10, 1932
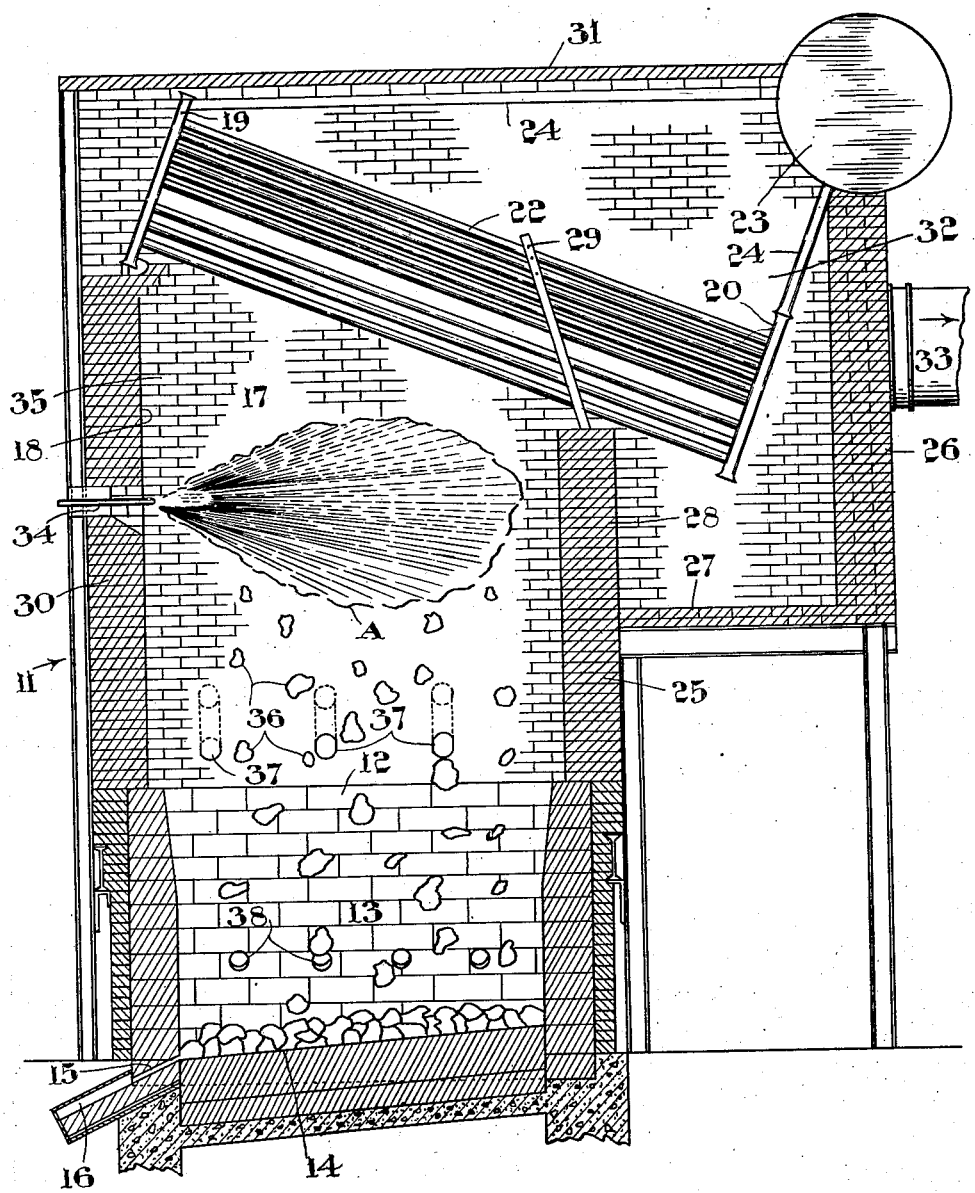
INVENTOR
GEORGE H. TOMLINSON
BY J. T. O'Connell
ATTORNEY Patented Feb. 16, 1937

2,070,632

UNITED STATES PATENT OFFICE 2,070,632

METHOD OF TREATING PULP MILL WASTE COOKING LIQUORS

George H. Tomlinson, Montreal, Quebec, Canada

Application March 10, 1932, Serial No. 597,996

11 Claims. (Cl. 23—48)

This invention relates to the recovery of chemicals contained in waste liquors resulting from processes of pulping cellulosic materials. More particularly, it comprises a method and apparatus which has proven especially useful in connection with the recovery of chemicals used in the kraft or sulphate pulping processes.

Various workers in this field have developed recovery processes based on the idea of introducing waste liquors, in atomized condition, into a hot combustion or recovery chamber wherein the spray particles, after evaporation of the water content, are burned in suspension in accordance with principles similar to those employed in the burning of oils or powdered fuels. In the commercial application of these processes difficulties are met with in controlling operating conditions so as to consistently produce satisfactory results. The maintenance of self-sustaining combustion; satisfactory reducing conditions; and prevention of excessive loss of chemicals through the draft stack of the recovery chamber presupposes a perfect co-relation of various controlling factors such as the initial concentration of the atomized liquor; the size of the spray particles; and the size, shape and dimensions of the recovery chamber which is impossible to attain in actual practice. If the liquor is not sufficiently concentrated or if the spray particles are too large the number of wet particles reaching the hearth will be sufficient to prevent further burning or combustion. If the spray is too fine it produces a large number of small particles which are carried out of the recovery chamber by the draft. Moreover, the burning of the particles in the form of a spray necessarily produces a large number of exceedingly fine residual particles containing the chemicals sought to be recovered. These residual particles are also carried away, to a greater or lesser extent, by the furnace draft and creates a condition which necessitates the use of more or less complicated recovery equipment outside the primary recovery chamber in order to prevent excessive chemical losses. Even with the most careful regulation of the spray, the burning of the particles in suspension is characterized by excessive loss of chemicals through the stack outlet and it also produces unsatisfactory reducing conditions since the amount and character of the carbon produced by the spray combustion does not provide for efficient reduction of the sulphates to sulphides.

The present invention has been developed to overcome these difficulties and is based on entirely different principles of operation. According to this invention the liquor is spray-dried in the upper region of a vertical stack furnace where it is introduced in the form of a coarse spray directed against one of the furnace walls. The direction of the spray and the regulation of the size of the particles so that substantially all of the water is evaporated before the particles reach the wall toward which they are projected is a comparatively simple matter. On reaching the wall the substantially dry particles adhere and build up into a plastic spongy cake which, after some further drying, gradually leaves the wall in the form of lumps which drop to the bottom of the furnace or recovery chamber where combustion proceeds with great rapidity since the lumps reach the hearth in a porous, spongy state containing all or a very considerable amount of the organic material in a substantially unburned condition. By confining combustion of the organic material to the lower region or hearth of the recovery chamber, the entire heat value of the fuel constituents of the waste liquor is rendered available for effecting evaporation of the spray particles entering the chamber above the combustion zone. To accomplish this it is, of course, desirable that the recovery chamber be designed so that all of the heat resulting from combustion on the hearth is caused to ascend through the spraying or drying zone. The surplus heat available after evaporation of the incoming spray is very considerable and is utilized for the generation of steam in a boiler located at the upper end of the recovery chamber. Owing to the direct absorption of heat by the incoming spray particles and by the boiler the development of excessive temperatures in the upper part of the recovery chamber is prevented so that wall replacement and other maintenance difficulties frequently due to excessive temperatures in this part of the recovery chamber are substantially avoided. Further avoidance of these maintenance difficulties may also be achieved by providing a relatively thin externally cooled section of wall structure for the upper part of the recovery chamber in order to prevent buckling effect due to the impingement of relatively cool spray particles on a too highly heated wall surface. When the recovery is carried out in accordance with the principles described herein it is a simple matter to regulate the spray to produce particles of such large size that the danger of these particles being carried away in flight is avoided. It is also possible with this process to effect the self-sustained evaporation and burning of comparatively dilute liquors within the recovery chamber. I have found, for example, that it is possible, through suitable spray regulation, to successfully dry the liquor when containing as much as two or more parts of water to one of solids but, in practice, it is usually more economical to concentrate the liquor in multiple effect evaporators to a much higher density, rather than to effect the evaporation of this excess water in the furnace. Thus, if the liquor is evaporated to a density corresponding to one part of water to one of solids, a very considerable surplus of heat becomes available, after evaporation of the incoming spray, for the generation of steam in the boiler.

In recovering the chemicals used in the kraft or sulphate pulping process air is admitted to the recovery chamber only at or slightly above the hearth, which is formed to slope towards a suitable outlet at the front of the furnace. This control of the air admission, together with the free burning characteristics of the combustible material delivered to the hearth, produces a reducing atmosphere at a point where the maximum quantity of reducing material, in an activated form, is available for accomplishing the reaction necessary to reduction of the sulphates to sulphides. Due to the rapid combustion on the hearth the chemicals melt and leave the furnace with such rapidity as to avoid danger of decomposition and reversion of the sulphides to sulphates.

Since the amount of dust particles leaving the upper portion of the recovery chamber in an unaltered condition is so small as to be practically negligible, it will be manifest that the boiler can be operated efficiently at high ratings and that the heat in the waste gases can be utilized in an economizer under conditions which are not possible where the dust losses are substantial as in cases where the liquor is dried and burned in the form of relatively small spray particles as heretofore proposed.

In the further description of this invention reference will be had to the accompanying drawing wherein I have shown a vertical shaft type of recovery furnace in which the process has been successfully carried out.

The recovery chamber or furnace is generally indicated at 11. The lower portion is provided with a soapstone lining 12 and forms a smelting chamber 13. The bottom 14 of the smelting chamber slopes toward an outlet 15 leading to a discharge spout 16 through which the smelt, comprising the recovered chemicals, is delivered to a suitable tank (not shown). The upper portion 17 of the furnace above the smelting chamber 13, is also provided with a suitable refractory lining 18. The top of the furnace or recovery chamber is formed principally by a boiler setting of the water tube type. As herein shown this setting comprises the front and rear headers 19 and 20, connecting water tubes 22, and the boiler drum 23. The latter is provided with connections 24 to the headers 19 and 20 and is supported at the upper rear corner of the furnace. The rear wall structure of the furnace comprises relatively offset vertical wall portions 25 and 26 and a connecting horizontal wall portion 27. The vertical wall 25 extends upwardly beyond the horizontal wall 27 to form a baffle 28 spaced inwardly from the lower portion of the vertical wall 26. Inclining upwardly and forwardly from the baffle 28 is a second baffle 29 through which the boiler tubes 22 pass as shown. In the operation of the furnace the products of combustion leaving the upper furnace portion 17 are first constrained to pass upwardly between the front furnace wall 30 and the baffles 28 and 29, whereby said products of combustion are initially brought into heat interchanging relation with the forward portion of the water tubes 22. The said products of combustion then pass rearwardly over the baffle 29 and beneath the top furnace wall 31 to the discharge flue 32 and out through the pipe 33.

The liquor to be treated is introduced into the upper furnace portion 17 through a spray nozzle 34 mounted in a suitable opening in the front furnace wall 30. The liquor is discharged from the nozzle in the form of a coarse spray which is projected against one of the side walls 35. When dealing with a coarse spray of this character it is a simple matter to regulate the size of the spray particles so that all of the particles will reach the wall 35 and will be deprived of the greater portion of their water content during transit. The size and velocity of the spray particles discharged will mainly depend upon the required length of furnace travel to reach the arresting wall surface, which distance will vary with the furnace size and cross-section employed. The spray particles coalesce on the wall 35 to form a spongy mass as indicated at A. This mass, after some further drying, gradually breaks away from the wall in the form of porous spongy lumps indicated at 36. All or a very substantial portion of the organic material originally present in the liquor is contained in these lumps and is carried to the hearth in a dry and substantially unburned condition. The combustion of the organic material on reaching the hearth is practically instantaneous and is characterized by the rapid production or evolution of activated carbon or reactive carbon compounds which, through their exceedingly high affinity for oxygen, cause the reducing reaction to proceed rapidly. This rapid combustion of a large amount of organic material at the reducing zone provides optimum reducing conditions since the reduction takes place rapidly and the sulphides are discharged from the furnace as quickly as they are formed so that there is practically no opportunity afforded for decomposition between the time of formation and the time of discharge of the sulphides.

All of the combustion heat ascending from the hearth formed by the bottom wall 14 is caused to pass through the evaporating zone on its way to the outlet pipe 33 and the intensity of the heat generated on the hearth is such that the surplus heat available for generation of steam in the boiler, after evaporation of the incoming liquor, is very considerable. It may be stated, however, that the temperature in the upper part of the furnace or recovery chamber is relatively low compared with the temperature in the lower portion due to the amount of heat which is directly absorbed by the incoming spray and by the boiler. This lowering of the temperature in the upper part of the furnace is of advantage in that the refractory lining need not be replaced as often as in the case of prevailing types of recovery furnaces in which excessively high temperatures prevail in the upper region of the recovery chamber. If the lining in the upper portion 17 of the furnace becomes too highly heated the spraying of the relatively cool liquid particles thereon is apt to cause a certain amount of buckling. In order to prevent this the present invention contemplates external cooling of the furnace portion 17 by any suitable method of circulating water or any other fluid in contact therewith.

Only one nozzle 34 is shown in the present drawing but it will be understood that the number and arrangement of nozzles employed in practice may be varied within wide limits. Usually two nozzles are arranged at a suitable inclination to spray the liquor against both of the side walls 35. The number and arrangement of the nozzles may also be such as to direct sprays of liquor against the front and rear walls as well as against the side walls. The invention therefore contemplates any arrangement of the nozzles which will cause substantially all of the spray particles to reach the wall surface towards which they are directed in a relatively dry condition and in such manner that the greater portion of the organic material is subseqently delivered to the hearth in the form of free burning lumps containing the chemicals to be recovered, together with an abundance of reducing carbonaceous material in an activated form.

When using a furnace of the type shown in the drawing and operating as described herein it has also been found that the quantity of salt cake introduced into the furnace with the waste liquor may be substantially increased as compared with present practice, in view of the fact that the amount of reducing carbonaceous material which is present in the reducing zone in an activated condition is considerably in excess of that required merely for recovering the chemical content of the waste liquor. Satisfactory combustion and reducing conditions are maintained in the lower region of the recovery chamber by supplying air in suitable quantities through the air inlets 37 and 38, the latter being relatively close to the hearth 14 and the latter being inclined so that the air admitted therethrough is directed downwardly towards the hearth. The gas velocity through the furnace and boiler is regulated in accordance with the furnace operating load to maintain effective combustion conditions in the furnace, while avoiding excessive carry-over of the liquor particles into the boiler.

By way of example, and not of limitation, I have successfully carried out my process in a refractory-walled vertical stack furnace, as shown in the drawing, fourteen feet in length by eight feet in width with a furnace height at the middle of the side walls 35 of twenty feet below a 265 H. P. horizontal tube bank steam boiler. Kraft black liquor having an average analysis as fired of 50% water and 50% dry solids was supplied through a pair of #9 Spraco nozzles having a discharge orifice three-eighths of an inch in diameter at a pressure of 40 lbs. per sq. in. and a temperature of 210° F. The nozzles were centrally located in the front wall 30 at a level corresponding to a central furnace height of about fifteen feet and relatively arranged to direct conical sprays of liquor toward opposite side walls 35. Each spray covered a side wall area of approximately sixty sq. ft. with a length of furnace travel of the liquor particles traveling axially of the nozzle of approximately nine ft. The average size of the spray particles discharged was estimated to be not greater than one-tenth of an inch in diameter. With a furnace temperature in the lower section of the furnace ranging from 1900° F.–2100° F. and above the spray level of from 1700° F.–1850° F. the material on the walls had an average analysis of about 5% water and 95% dry solids. With a furnace capacity corresponding to 50 tons of air-dried pulp per day, the gas velocity through the furnace was computed to be approximately 365 ft. per minute. Under these conditions self-sustaining combustion was easily maintained on the hearth, a high percentage of chemical recovery and reduction obtained, and a high rate of steam generated per ton of liquor fired.

Having thus described my invention, what I claim is:—

1. A self-sustaining process of recovering chemicals and heat in a stationary recovery furnace of the vertical shaft type from liquor containing chemicals and combustible organic matter which comprises introducing the liquor into the upper section of the furnace in a spray sufficiently coarse to cause a major portion thereof to pass through high temperature heating gases and while in a resultant sticky condition to collect and coalesce in an adhering mass on an arresting surface in heat absorbing relation with the heating gases, whereby the liquor so treated will be substantially completely dehydrated in the upper section without substantial change in its initial organic content and lumps of dehydrated material will break away from said mass and fall into the lower section of the furnace, burning the lumps of dehydrated material falling from said mass in the lower section of the furnace whereby the included chemicals are smelted, passing the high temperature heating gases generated in the lower section upwardly through the upper section for the dehydration of liquor being introduced into the upper section, and withdrawing the incombustible inorganic residue in a molten condition from the lower section.

2. A self-sustaining process of recovering chemicals and heat in a stationary recovery furnace of the vertical shaft type from liquor containing chemicals and combustible organic matter which comprises maintaining an upper drying zone and a lower combustion and smelting zone in the furnace, introducing the liquor in a spray sufficiently coarse to cause a major portion thereof to pass through high temperature heating gases in the drying zone and while in a resultant sticky condition to collect and coalesce in an adhering mass on an arresting surface contacted by the heating gases, whereby the liquor so treated is substantially completely dehydrated without substantial change in its initial organic content and lumps of dehydrated material break away from said mass and fall into the combustion and smelting zone, burning the lumps of dehydrated material falling from said mass in the combustion and smelting zone without the addition of other combustible matter whereby the included chemicals are smelted in the combustion and smelting zone, passing the high temperature heating gases generated in the combustion and smelting zone upwardly through the drying zone for the dehydration of liquor being introduced into the drying zone, and withdrawing the incombustible inorganic residue in a molten condition from the combustion and smelting zone.

3. A self-sustaining process of recovering chemicals and heat in a stationary recovery furnace of the vertical shaft type from paper pulp residual liquor containing chemicals and combustible organic matter which comprises maintaining an upper drying zone and a lower combustion zone in the furnace, introducing the liquor in a spray sufficiently coarse to cause a major portion thereof to pass through an ascending stream of high temperature heating gases in the drying zone and while in a resultant sticky condition to collect and coalesce in an adhering mass on a vertically disposed arresting surface in the drying zone in heat absorbing relation with the heating gases, whereby the liquor so treated will be substantially completely dehydrated in the drying zone without substantial change in its initial organic content and dehydrated material will separate from said mass and collect in the combustion zone, burning the lumps of dehydrated material separating from said mass in the combustion zone, and passing the high temperature heating gases generated in the combustion zone upwardly through the drying zone for the dehydration of residual liquor being introduced into the drying zone.

4. A self-sustaining process of recovering chemicals and heat in a stationary recovery furnace of the vertical shaft type from paper pulp residual liquor containing chemicals and combustible organic matter which comprises maintaining an upper drying zone and a lower combustion and smelting zone in the furnace, introducing the liquor in a spray sufficiently coarse to cause a major portion thereof to pass through an ascending stream of high temperature heating gases in the drying zone and while in a resultant sticky condition to collect and coalesce in an adhering mass on a vertically disposed arresting surface in the drying zone contacted by the heating gases, whereby the liquor so treated is substantially completely dehydrated without substantial change in its initial organic content and lumps of dehydrated material break away from said mass and fall into the combustion and smelting zone, burning the lumps of dehydrated material falling from said mass in the combustion and smelting zone whereby the included chemicals are smelted in the combustion and smelting zone, passing the high temperature heating gases generated in the combustion and smelting zone upwardly through the drying zone for the dehydration of residual liquor being introduced into the drying zone, and withdrawing the incombustible inorganic residue in a molten condition from the combustion and smelting zone.

5. A self-sustaining process of recovering chemicals and heat in a stationary recovery furnace of the vertical shaft type from paper pulp residual liquor containing chemicals and combustible organic matter which comprises maintaining an upper drying zone and a lower combustion and smelting zone in the furnace, introducing the liquor along one of the vertical furnace walls in a spray sufficiently coarse and at sufficient velocity to cause a major portion thereof to pass substantially horizontally across the furnace through an ascending stream of high temperature heating gases in the drying zone and while in a resultant sticky condition to collect and coalesce in an adhering mass on another vertical furnace wall in the drying zone in heat absorbing relation with the heating gases, whereby the liquor so treated will be substantially completely dehydrated in the drying zone without substantial change in its initial organic content and lumps of dehydrated material in a porous spongy condition will break away from said mass and fall into the combustion and smelting zone, burning the lumps of dehydrated material falling from said mass in the combustion and smelting zone whereby the included chemicals are smelted in the combustion and smelting zone, passing the high temperature heating gases generated in the combustion and smelting zone upwardly through the drying zone for the dehydration of residual liquor being introduced into the drying zone, withdrawing the incombustible inorganic residue in a molten condition from the combustion and smelting zone, and withdrawing the heating gases from the furnace above the spray level.

6. A self-sustaining process of recovering chemicals and heat in a stationary recovery furnace of the vertical shaft type from sulphate paper pulp residual liquor containing chemicals and combustible organic matter which comprises introducing the liquor in a spray directed across the upper section of the furnace and having spray particles of a size and velocity sufficient to cause a major portion of the spray particles to impact on a vertically disposed arresting surface in the upper section of the furnace after passing through and being heated by an ascending stream of high temperature heating gases sufficiently to put the spray particles when impacting in a sticky condition, whereby the impacting material will adhere to the arresting surface while exposed to the ascending high temperature gases until the material is in a substantially dehydrated condition but without substantial change in its initial organic content, collecting and burning dehydrated material separating from said surface in the lower section of the furnace under chemical reducing conditions whereby the heat generated in the lower section effects the liquefaction and reduction therein of the included chemicals, passing the high temperature heating gases generated in the lower section into the upper section for dehydrating liquor being introduced into the upper section, withdrawing the high temperature gases from the upper section above the spray level, and withdrawing the liquefied chemicals from the lower section.

7. Apparatus for recovering chemicals and heat from liquor containing chemicals and combustible organic matter comprising vertical front, side and rear walls defining a stationary furnace of the vertical shaft type of substantially rectangular horizontal cross-section having an upper section receiving high temperature heating gases from a communicating lower section, spray means in said front wall for introducing the liquor so arranged that the liquor is directed in a spray substantially horizontally across said upper section in intimate contact with said heating gases and in particles of such size and at such velocity that they impact against at least one of said vertical side walls over an extended area in condition to coalesce thereon in an adhering mass, a hearth at the bottom of said lower section arranged to receive the substantially dry material falling from said adhering mass, means for supplying air for the combustion of the material collecting on said hearth in a position to radiate heat to said upper section, a heating gas outlet from said upper section wholly above the spray level, and an outlet in said lower section for the molten incombustible residue.

8. Apparatus for recovering chemicals and heat from liquor containing chemicals and combustible organic matter comprising vertical walls defining a stationary furnace of the vertical shaft type of substantially rectangular horizontal cross-section having an upper section receiving high temperature heating gases from a communicating lower section and a heating gas outlet extending substantially throughout the top thereof, spray means for introducing the liquor so arranged that the liquor is directed in a spray substantially horizontally across said upper section below said heating gas outlet in intimate contact with said heating gases and in particles of such size and at such velocity that they impact against one of said vertical walls in condition to coalesce thereon in an adhering mass, a hearth at the bottom of said lower section arranged to receive substantially dry material from said adhering mass, means for supplying air for the combustion of the material collecting on said hearth in a position to radiate heat to said upper section, a steam boiler above said furnace and having a horizontally inclined tube bank extending longitudinally of and across said heating gas outlet, and an outlet in said lower section for the molten incombustible residue.

9. A self-sustaining process of treating paper pulp residual liquor in a stationary recovery furnace of the vertical shaft type which comprises introducing the liquor into the upper section of the furnace in a spray sufficiently coarse and at such velocity as to cause a major portion thereof to pass through high temperature heating gases and while in a resultant sticky condition to collect and coalesce in an adhering mass on an arresting surface in heat absorbing relation with the heating gases, whereby the liquor so treated will be substantially completely dehydrated in the upper section without substantial change in its initial organic content and lumps of dehydrated material will break away from said mass and fall into the lower section of the furnace, burning the lumps of dehydrated material falling from said mass in the lower section of the furnace, and passing the high temperature heating gases generated in the lower section upwardly through the upper section for the dehydration of liquor being introduced into the upper section.

10. A process of treating paper pulp residual liquor which comprises introducing the liquor into a vertical furnace in a spray directed across the upper section of the furnace and formed of spray particles of a size and at a velocity such that a major portion of the spray particles impact on a vertically disposed wall surface in the upper section of the furnace after passing through and being heated by an ascending stream of high temperature gases sufficiently to put the spray particles when impacting in a sticky condition and to cause the spray particles to deposit on the wall surface over an extended area in an adhering mass and from which mass dehydrated portions separate and collect in the lower section of the furnace, supplying air to the lower section of the furnace for the combustion therein of the combustible portion of the separated material, and withdrawing the high temperature gases generated in the lower section of the furnace from the upper section of the furnace after contacting with liquor being sprayed across the upper section of the furnace.

11. In the operation of a chemical recovery furnace having a furnace chamber of substantial height with a heating gas outlet confined to the upper section thereof, a hearth at the bottom of the lower section thereof and at a substantial distance below said heating gas outlet, and a smelt outlet from said hearth, the process of recovering chemicals and heat from sulphate paper pulp residual liquor which comprises introducing the liquor into the furnace chamber in a spray directed into the upper section of the furnace chamber and formed of spray particles of a size and at a velocity such that a major portion of the spray particles impacts on an approximately vertical arresting surface approximately normal to the direction of spray and in the upper section of the furnace chamber after passing through and being heated by an ascending stream of high temperature gases sufficiently to put the spray particles when impacting in a sticky condition and to cause the spray particles to deposit on the arresting surface over an extended area in an adhering mass and from which mass dehydrated portions separate and fall directly onto a bed of separated material on the hearth in a dry porous condition and with substantially their initial organic content, supplying air to the lower section for burning the combustible portion of the separated material on the hearth under chemical reducing conditions whereby the heat generated effects the liquefaction and reduction therein of the included chemicals, withdrawing the high temperature gases generated through the heating gas outlet after contacting with residual liquor being sprayed into the upper section, and withdrawing the liquefied chemicals from the lower section through the smelt outlet.

GEORGE H. TOMLINSON.